Sept. 13, 1932.   H. W. LORMOR   1,876,989

STORAGE BATTERY

Filed Oct. 10, 1928

Inventor
Henry W. Lormor
Kwis Hudson & Kent
attys.

Patented Sept. 13, 1932

1,876,989

UNITED STATES PATENT OFFICE

HENRY W. LORMOR, OF CLEVELAND HEIGHTS, OHIO, ASSIGNOR TO WILLARD STORAGE BATTERY COMPANY, OF CLEVELAND, OHIO, A CORPORATION OF WEST VIRGINIA

STORAGE BATTERY

Application filed October 10, 1928. Serial No. 311,485.

This invention relates to storage batteries and more particularly to the manner in which the cover is attached to the storage battery case or container.

An important feature of the present invention is to provide a sealing means between the cover and the storage battery container which is simple in construction, efficient in operation and inexpensive to manufacture.

A further object of the invention is to provide an efficient vacuum sealing means between the cover and the storage battery container to thereby provide an air, acid and gas tight seal.

With the objects above indicated and other objects hereinafter explained in view, the invention consists in the construction and combination of elements hereinafter described and claimed.

Figure 1:
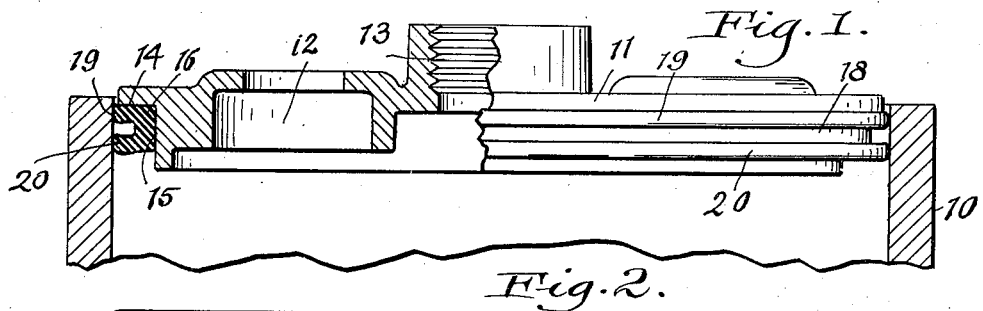
Fig. 1 is a fragmentary view showing the manner of attaching a cover to a storage battery case embodying the present invention.
Figure 2:
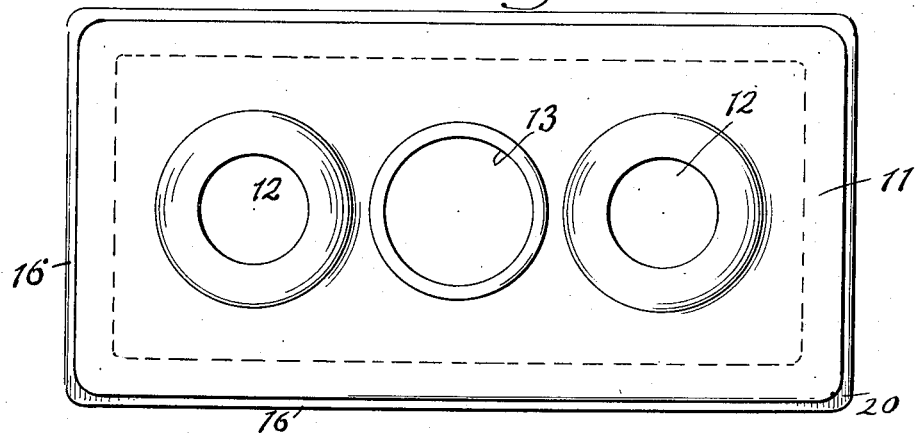
Fig. 2 is a top plan view of the same.
Figure 3:
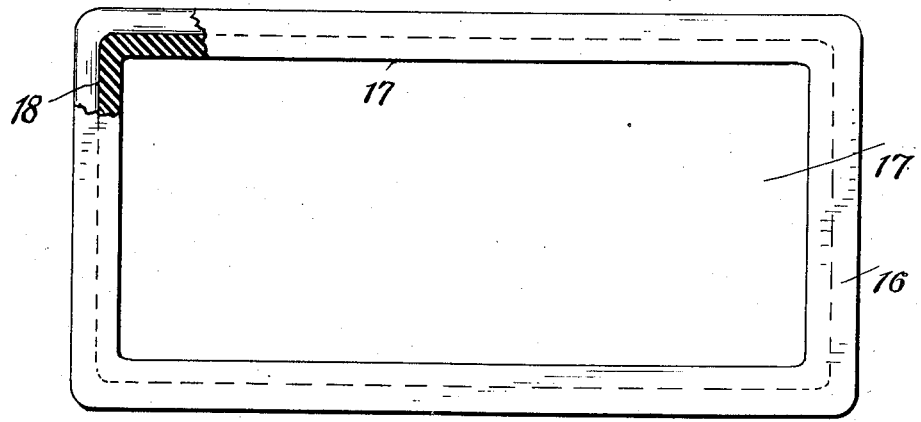
Fig. 3 is a top plan view of the sealing ring.

Referring to the drawing, 10 represents a storage battery container of rubber or other suitable material and of standard construction, which is provided preferably with a hard rubber or other suitable material cover 11 adapted to close the opening in the upper portion of the container 10.

The cover may be of any desired design and is usually provided with openings 12 through which the terminal posts of the storage battery plates extend and an opening 13 adapted to receive the usual vent plug.

It is customary to secure the cover 11 within the opening in the container 10 by introducing a sealing compound such as plastic cement or asphaltum base between the adjacent edges of the cover and the inner walls of the opening respectively but this usually produces a messy appearance and is easily marked or disfigured when slightly heated.

It is one of the features of the invention, therefore, to eliminate the use of this sealing compound and to secure the cover 11 within the opening in the container 10 by the introduction of a soft rubber sealing ring disposed therebetween and adapted to retain the cover 11 in proper position by the action of vacuum and friction.

This may be carried out very efficiently in the following manner, although it is to be understood that the invention is not to be limited to the precise construction and arrangement herein disclosed.

Figures 4, 5:
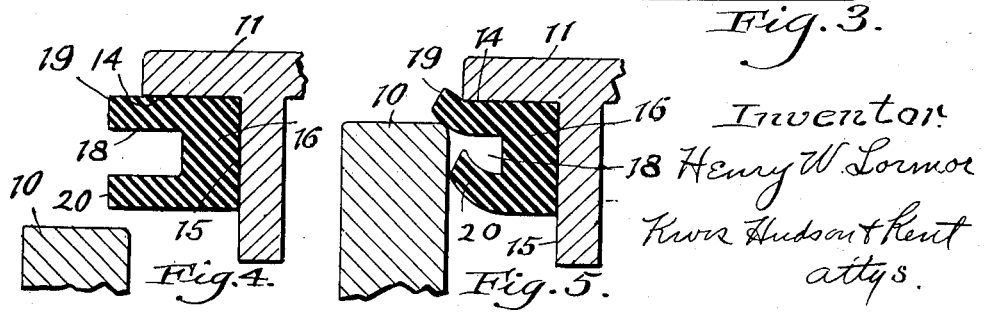
Fig. 4 is a fragmentary sectional view showing the position of the cover and ring before its insertion into the container.
Fig. 5 is a fragmentary detail showing the cover being introduced into the container.

The cover 11 is provided with a laterally extending flange 14, the outside dimensions of which are slightly less than the inside dimensions of the opening in the container 10. The cover 11 is further provided with a depending annular portion 15 adjacent the flange 14 and provides a space adapted to receive a rectangularly shaped soft rubber ring 16. This rubber ring is provided with a transverse opening 17 adapted to fit over the end of the depending flange 15 with the upper surface engaging the under surface of the flange 14, as clearly shown in Figs. 1, 4 and 5.

This soft rubber ring may be held in position upon the cover 11 by rubber cement or any other suitable adhesive compound so as to prevent disengagement between the rubber ring and the cover.

The rubber ring 16 is provided with a groove 18 which extends entirely around the four sides of the ring 16 and which extends inwardly from the outer periphery thereof to provide an upper lip 19 and a lower lip 20. The outside dimensions of the rubber ring 16 are somewhat greater than the inner dimensions of the opening in the container 10 so that in order to force the cover 11, with the rubber ring attached thereto, within the opening in the top of the container 10, it is necessary to exert some pressure.

In placing the cover 11 to which the rubber ring 16 has been secured, within the opening in the container 10, the cover and ring are introduced into the opening and pressed downwardly. In pressing the cover downwardly, the lower lip 20 of the rubber ring 16 engages the inner edge of the container adjacent the opening and is moved upwardly toward the upper lip 19 due to frictional engagement between the lip 20 and the inner surface of the container 10. This materially reduces the area of the groove 18 and, at the same time, a portion of the air which was within the groove 18 is forced out of the groove. Further depression of the cover causes the upper lip 19 to be moved into engagement with the inner wall of the container adjacent the opening and as the sides of the container push the lips inwardly, the area within the groove 18 is distended or increased, thus causing a partial vacuum within the groove 18 between the rubber ring 16 and the inner walls of the container 10. The cover 11, therefore, is securely held within the container 10 by the suction or vacuum created within the groove 18 and additionally is retained in proper position due to frictional engagement between the ring 16 and the inner walls of the container 10.

This sealing means has the further advantage of taking up any swelling or shrinkage, due to temperature changes within the battery or any external temperature change which might cause the battery case or cover to shrink, due to the rubber ring being under compression.

While I have described the preferred embodiment of the invention, it is to be understood that I am not to be limited thereto as changes and modifications may be resorted to without departing from the spirit of the invention as defined in the appended claims.

Having thus described my invention, what I claim is:

1. In a storage battery, the combination of a container, a cover for said container, a rubber ring carried by said cover, and a groove in said ring whereby when said cover is inserted into said container, the ring is maintained in engagement with the container through suction.

2. The method of securing a cover, provided with a sealing ring, to a container which comprises creating a suction or vacuum between the sealing ring and the container by depressing the cover within the container.

3. The method of securing a cover to a container which comprises interposing between the cover and the container a resilient ring which is provided with a recessed portion, forcing the cover and the ring within the opening of the container in such a manner as to eject air from the recessed portion to thereby create a vacuum to maintain the ring in engagement with the walls of the container.

4. In a storage battery, the combination of a container, a cover for said container, said cover having a laterally extending flange to provide an abutment upon the under side thereof, and a resilient member extending around said cover in engagement with said abutment, said resilient member being engageable with the inner adjacent surfaces of the walls of said container and having a groove in the face thereof which contacts with said surfaces.

In testimony whereof, I hereunto affix my signature.

HENRY W. LORMOR.